Nov. 7, 1933.    W. H. BOLDINGH    1,933,652
PROCESS OF MAKING X-RAY PHOTOGRAPHS
Filed Dec. 26, 1929
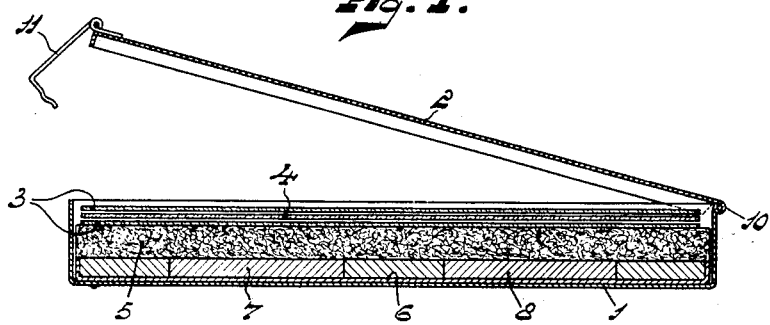
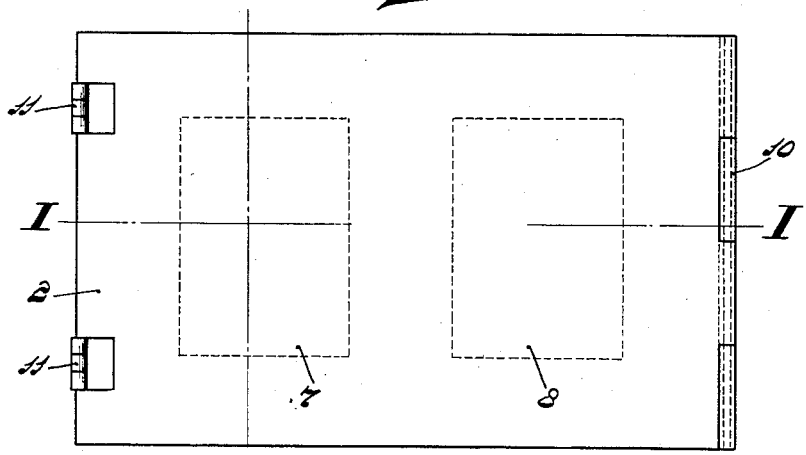
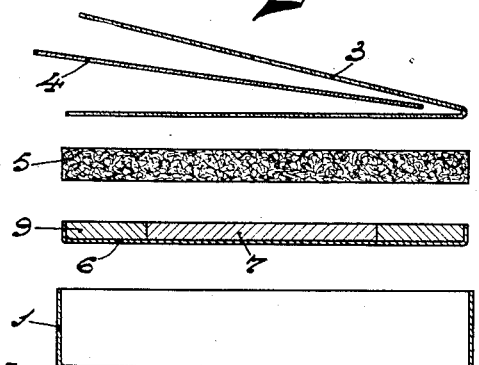
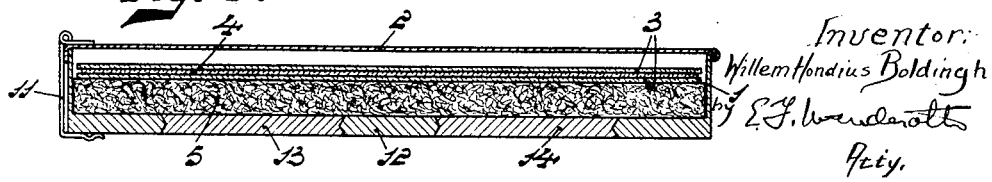
Inventor:
Willem Hondius Boldingh
by E. F. Wenderoth
Atty.

Patented Nov. 7, 1933

1,933,652

UNITED STATES PATENT OFFICE 1,933,652

PROCESS OF MAKING X-RAY PHOTOGRAPHS

Willem Hondius Boldingh, Eindhoven, Netherlands, assignor to N. V. Philips' Gloeilampenfabrieken, Eindhoven, Netherlands, a limited liability company of The Netherlands Application December 26, 1929, Serial No. 416,710, and in The Netherlands February 20, 1929

7 Claims. (Cl. 250—34)

In order to be able to properly examine X-ray images fixed on a transparent photographic plate or film the latter is usually so arranged in front of a light source, that the image is placed between the light source and the eye. Frequently only a small part of such a photograph need be examined, in which case it may be troublesome that this part is surrounded by a relatively large surface of the plate, belonging to the X-ray image of the body exposed or to its surroundings, which surface however is immaterial for the examination and actually diverts attention from the part to be examined. Especially with stereoscopic X-ray photographs the inspection of the twofold images is frequently attended with much trouble, although with single images the same drawback prevails.

In order to obviate the trouble caused by this effect it has been proposed to use light cases provided with slides which are shoved before that part of the plate which does not belong to the part of the image to be examined.

It is the object of my invention to make radiograms on which only those parts of the images are visible on the developed negative which are of real interest, the marginal parts being masked.

Another object of my invention is to make transparent radiograms having a black frame or margin so as to eliminate the marginal light which would impede observation.

The invention further relates to a cassette for photographic plates used in X-ray photography, which permits the provision of such a black frame or margin, without requiring for this purpose the removal of the sensitive plate from the cassette.

In order to enable a quiet contemplation of the radiogram, I use an additional radiation of the sensitized film, with the interposition of a plate which is impervious to X-rays, and block out the portion of the film occupied by the picture to be viewed.

Those parts of the plate which are not occupied by part of the X-ray image may be additionally irradiated by covering the spot of the image and subsequently irradiating the plate in the same manner as when making the image. In this case the covered part remains unexposed and the image fixed thereon preserved.

The additionally irradiated parts become equally black after the development and will intercept the light when the photographs are examined by means of lightrays passing through them. Thereby an agreeable effect is produced for the eye.

It may be effected as well from the opposite side. In this case the plate blocking out the picture area may be applied to the base wall of the cassette and after the exposure is made one may simply turn the cassette and expose the underside thereof whereby the screen prevents the rays from striking those portions of the sensitized film which are designed to bear the picture to be viewed.

In an embodiment the cassette according to my invention, having as usual a wall which is translucent for X-rays, comprises a plate which is interposed between one of the flat sides of the cassette wall and the sensitized film. This plate consists of a material impervious to X-rays (for example lead) and as regards shape, size and position the said plate corresponds to the picture area of the photographic plate. It will be clear that every place where the present description uses the term "photographic" this term is intended to indicate glass plates having a sensitized area as well as flexible films or xylonite or like material.

A suitable embodiment of the cassette is obtained by providing same with a plurality of interchangeable impervious plates.

In another embodiment one or more of such plates are so arranged as to constitute part of the bottom of the cassette.

The invention will be more clearly understood by reference to the accompanying drawing. In this drawing:

Figures 1 and 2 are respectively a section along the line I—I and a plan view of an embodiment of a cassette according to the invention.

Figure 3 is a section along the line III—III of the cassette the various parts contained therein being shown individually.

Fig. 4 is a section through a modified form of cassette according to my invention.

The casette shown in these figures is adapted to be used for the production of stereoscopic X-ray photographs. To this effect two X-ray images are successively taken which are fixed side by side on one film or vitreous plate and exposed from two points which are spaced away by a few centimetres from each other.

In all of the figures 1 is a flat rectangular casing, which may be closed by a cover 2 such that light rays cannot penetrate thereinto. Both the casing and the cover may be made of aluminium but also other materials readily allowing the passage of X-rays may be used. The cassette contains an intensifying screen 3 and a photographic plate or film 4. The intensifying screen serves to enhance the action of the X-rays on the photographic plate, since it absorbs X-rays and is consequently capable of emitting a photographically active fluorescent light.

The screen 3 with the plate 4 bears on a layer of a rather plastic material 5, for example, felt. Thereunder are arranged in the embodiment illustrated in Figs. 1 and 3 two lead-cover-plates 7 and 8, which are maintained properly spaced away both from each other and from the wall of the cassette by means of filling-in pieces 9. The latter as well as the lead-plates are placed in a separate container 6, which may be taken out of the cassette and replaced by another one whilst it may also be provided with plates of different shape and size.

The cover 2 is hingedly attached to the box at 10 and may be closed by means of thumb-snatches 11. When an X-ray photograph is being taken, the cassette is closed and turned with its cover towards the X-ray source. After the exposure the whole cassette is turned upside-down so that its bottom is turned to the source of X-rays. Thereupon it is subjected again to irradiation.

Since the lead-plates 7 and 8 absorb the X-rays but the surroundings of these plates do not constitute a hindrance to these rays, the latter can act upon the photographic plate surrounding that part which is covered by the plates 7 and 8. After the negative has been developed that part which has not been covered by the lead-plates 7 and 8 during the irradiation will consequently show an equally black surface and not transmit annoying light upon examination.

In the embodiment shown in Fig. 4 the screening plates instead of being placed in a separate container according to the embodiment described with reference to Figs. 1 and 3, are made as a part of the bottom of the cassette. This bottom 12 is shown in the Fig. 4 comprising two insertions 13 and 14 which correspond with the lead plates 7 and 8 of Figs. 1 and 3. In all other respects the cassette is identical to that above described. In Fig. 4 the cassette is shown in a position, having its cover 2 closed.

What I claim is:

1. The process of producing sharply defined X-ray photographic images, comprising a two-step exposure of an X-ray film to a source of X-rays, one of the steps comprising the additional step of interposing the objects to be photographed between the source of X-rays and the film, and the other step comprising substantially directly exposing to the X-ray source only those portions of the film outside the portion occupied by the picture to be viewed.

2. The process of producing sharply contrasted X-ray photographic images, comprising exposing an X-ray film to a source of X-rays while the object to be photographed is interposed therebetween, removing the said object, blocking off with X-ray opaque material that portion of the X-ray film containing the image of the desired portion of the said object, and then substantially directly exposing the remaining X-ray transparent portion of the film.

3. The process of producing sharply defined X-ray photographic images, comprising blocking out with X-ray opaque material that portion of the X-ray film designed to receive the image of the object to be photographed, substantially directly exposing the remaining, X-ray transparent portion of the film, removing the X-ray opaque material and interposing the objects to be photographed between the source of X-rays and the film, and exposing the previously unexposed portion of the film.

4. The process of producing sharply contrasted X-ray photographic images, comprising the steps of exposing an X-ray film to a source of X-rays, first on one side of the film and then on the other, one of the steps comprising the additional step of interposing the object to be photographed between the source of X-rays and the film, and the other step comprising substantially directly exposing to the X-ray source only those portions of the film outside the portion occupied by the picture to be viewed.

5. A cassette for photographic plates, the wall of which has a cover which is pervious to X-rays, to permit the X-rays to act on the portion of the sensitized plate which is destined to bear the image to be viewed and a base which is partly pervious and partly impervious to X-rays, the impervious portion of the base preventing X-rays which fall on the other side of the cassette from striking the said portion of the sensitized plate, the pervious portion of the base permitting the X-rays to act on the remaining portions.

6. A cassette for photographic plates adapted for making stereoscopic twin radiograms comprising a casing, a sensitized film in said casing and two plates in said casing, which are impervious to X-rays, said plates being disposed at one side of the sensitized film opposite the source of X-rays, to block out those portions on said film which are designed to bear both parts of the twin radiogram during the preliminary irradiation in which the cassette is reversed from its normal operable position.

7. A cassette for photographic plates, the wall of which has a cover which is pervious to X-rays to permit the X-rays to act on the portion of the sensitized film which is destined to bear the image to be viewed, said cassette containing a plate which is impervious to X-rays, said plate being disposed at that side of the sensitive plate which is turned away from the cover and extending over an area which corresponds to the said portion of the sensitive plate, said impervious plate preventing X-rays passing the cassette from the side opposite to the cover from striking the said portion of the sensitive plate and permitting the X-rays to act on the remaining portions of the sensitive plate.

WILLEM HONDIUS BOLDINGH.